Patented Oct. 29, 1935

2,019,032

UNITED STATES PATENT OFFICE 2,019,032

AMINE OF HIGH COLOR STABILITY AND PROCESS OF PRODUCING IT

Robert Paul Weiss and John Morris Weiss, New York, N. Y., assignors to Weiss and Downs, Inc., New York, N. Y., a corporation of New York No Drawing. Application September 19, 1934, Serial No. 744,667

5 Claims. (Cl. 260—130.5)

In the commercial manufacture of amines, and especially aromatic amines, it is very desirable to produce materials of light color which will not darken or only darken slightly under the usual conditions of storage. Such materials as aniline, toludine, xylidine, naphthylamine, etc., when freshly distilled, under atmospheric pressure or under vacuum, are water white or only slightly straw color as liquids. Under storage conditions however, they take on a darker color with greater or less rapidity which may progress to a deep red color or in extreme cases to an almost black appearance in thick layers.

We have found that this formation of color in storage can be prevented or retarded to a considerable degree by the addition of relatively small amounts of maleic anhydride prior to the final distillation of the amine. With aniline for example, it is known that the product made by the reduction of nitro benzene with iron filings and hydrochloric acid is very prone to darken in storage, more so than the product made by the amination of chlor benzol. This difference in behavior is probably due to the presence of minute amounts of impurities in the aniline produced by the reduction of nitro benzol which impurities are absent or present in lesser amount in the chlor benzol product. Maleic anhydride appears to combine selectively with these impurities and render them nonvolatile, thereby producing an aniline which has markedly improved color characteristics after a period of storage. We have no theory as to what the impurities removed are or what the chemical mechanism of their removal is, if indeed the improvement obtained is due to the removal of impurities.

If an excess of maleic anhydride is used, this does not appear in the distillate to contaminate the product, since any maleic anhydride, in excess of the amount required to give the desired degree of color stability, combines with the amine employed to form compounds which are substantially non-volatile at the temperature of distillation of the amine, especially when the distillation is carried on under vacuum. It is of course preferable to avoid any substantial excess of maleic anhydride over that necessary to produce the desired degree of color stability, both from the standpoint of the cost of the treating agent and the fact that an excess of maleic anhydride necessarily lowers the yield of distilled amine obtained.

As a specific example to illustrate the invention, we describe results obtained with aniline but do not intend that the scope of the invention shall be limited thereby, but shall only be limited by the appended claims.

Crude aniline from the reduction of nitrobenzol by iron filings was employed as raw material. The crude aniline was placed in a still and water and some aniline distilled off at atmospheric pressure. The aniline distilling over with the water was separated to be added to a later batch of crude. To the dried aniline in the still, approximately 1% by weight of maleic anhydride crystals were added while the mass was still hot at a temperature of 140–150° C. After being allowed to stand for about a half hour, vacuum was applied and the refined aniline oil distilled off. A material almost water white in color was obtained. A similar run without the use of maleic anhydride gave a straw color product. On standing in bottles protected from the light, the untreated product darkens at a faster rate than the treated product which latter showed only an imperceptible color change after several weeks standing.

It has been our experience that all grades of aniline will darken rather rapidly when exposed to direct sunlight. Tests have shown that the aniline treated with maleic anhydride colors at a noticeably slower rate under such conditions than similar material which has not undergone the maleic anhydride treatment.

The specific proportions stated are illustrative but we have used greater and lesser proportions with satisfactory results. In general, the use of more than 2% by weight of maleic anhydride, based on the amine employed, has not proved advantageous. The process has also been applied to the redistillation of amines which have become darkened in storage. Instead of maleic anhydride, we may employ maleic acid, fumaric acid or like products which can decompose to form maleic anhydride under the treating conditions employed.

It is our intention to include in our invention both the process of treatment and the new and improved products produced thereby.

Having thus described our invention, we claim:

1. The process of increasing the color stability of a primary aromatic amine by treating it with less than 1/50 mole of maleic anhydride per mole of amine.

2. The process comprising treating a primary aromatic amine with less than 2% by weight of maleic anhydride and distilling said aromatic amine.

3. The process comprising treating aniline with less than 2% by weight of maleic anhydride and distilling said aniline under vacuum.

4. The process comprising treating aniline with less than 2% by weight of maleic anhydride and distilling said aniline.

5. The process comprising treating aniline with less than 2% by weight of maleic anhydride.

ROBERT PAUL WEISS.
JOHN MORRIS WEISS.